United States Patent
Sun et al.

(10) Patent No.: US 11,741,684 B2
(45) Date of Patent: Aug. 29, 2023

(54) IMAGE PROCESSING METHOD, ELECTRONIC DEVICE AND STORAGE MEDIUM FOR PERFORMING SKIN COLOR RECOGNITION ON A FACE IMAGE

(71) Applicant: BEIJING BAIDU NETCOM SCIENCE AND TECHNOLOGY CO., LTD., Beijing (CN)

(72) Inventors: Hao Sun, Beijing (CN); Fu Li, Beijing (CN); Xin Li, Beijing (CN); Tianwei Lin, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 336 days.

(21) Appl. No.: 17/332,520

(22) Filed: May 27, 2021

(65) Prior Publication Data

US 2021/0286975 A1   Sep. 16, 2021

(30) Foreign Application Priority Data

Aug. 20, 2020  (CN) .......................... 202010845602.2

(51) Int. Cl.
*G06V 10/20*   (2022.01)
*G06V 10/25*   (2022.01)
(Continued)

(52) U.S. Cl.
CPC ................ *G06V 10/25* (2022.01); *G06T 3/60* (2013.01); *G06T 7/11* (2017.01); *G06T 7/90* (2017.01);
(Continued)

(58) Field of Classification Search
CPC ...... G06V 20/20; G06V 10/25; G06V 10/772; G06V 10/758; G06V 40/162; G06T 3/60; G06T 2207/30201
(Continued)

(56) References Cited

U.S. PATENT DOCUMENTS 8,698,796 B2   4/2014   Mochizuki
8,824,747 B2   9/2014   Free
(Continued)

OTHER PUBLICATIONS

Extended European Search Report for Application No. 21179254.4, dated Nov. 17, 2021, 8 pages.

*Primary Examiner* — Gabriel I Garcia
(74) *Attorney, Agent, or Firm* — Lippes Mathias LLP

(57) ABSTRACT

The disclosure provides an image processing method, an image processing apparatus, an electronic device and a storage medium, which belongs to the field of computer technologies, and specifically relates to computing vision, image processing, face recognition, and deep learning technologies in artificial intelligence. The method includes: performing skin color recognition on a face image to be processed to determine a target skin color of a face contained in the face image; obtaining a reference transformation image corresponding to the face image by processing the face image using any style transfer model in response that a style transfer model set does not comprise a style transfer model corresponding to the target skin color; and obtaining a target transformation image matching the target skin color by adjusting a hue value, a saturation value, and a lightness value of each pixel in the target region based on the target skin color.

20 Claims, 5 Drawing Sheets

(51) Int. Cl.
*G06T 7/11* (2017.01)
*G06T 7/90* (2017.01)
*G06T 3/60* (2006.01)
*G06V 40/16* (2022.01)
*G06V 10/75* (2022.01)
*G06V 10/772* (2022.01)
*G06V 20/20* (2022.01)

(52) U.S. Cl.
CPC .......... *G06V 10/758* (2022.01); *G06V 10/772* (2022.01); *G06V 20/20* (2022.01); *G06V 40/162* (2022.01); *G06T 2207/30201* (2013.01)

(58) Field of Classification Search
USPC ........................................................ 382/100
See application file for complete search history.

(56) References Cited

U.S. PATENT DOCUMENTS

| | | | |
|---|---|---|---|
| 9,256,950 B1 | 2/2016 | Xu et al. | |
| 2018/0300850 A1* | 10/2018 | Johnson | G06T 3/0093 |
| 2020/0234482 A1* | 7/2020 | Krokhalev | G06V 40/167 |
| 2020/0380279 A1* | 12/2020 | Yang | G06F 17/18 |
| 2021/0027513 A1* | 1/2021 | Choi | G06T 15/205 |
| 2021/0049349 A1* | 2/2021 | Farokhi | G06V 40/166 |

* cited by examiner

IMAGE PROCESSING METHOD, ELECTRONIC DEVICE AND STORAGE MEDIUM FOR PERFORMING SKIN COLOR RECOGNITION ON A FACE IMAGE

CROSS-REFERENCE TO RELATED APPLICATION

This application is based on and claims priority to Chinese Patent Application No. 202010845602.2 filed on Aug. 20, 2020, the content of which is hereby incorporated by reference in its entirety into this disclosure.

TECHNICAL FIELD

The disclosure relates to the field of computers, specifically relates to computing vision, image processing, face recognition, and deep learning technologies in artificial intelligence, and in particular to an image processing method, an electronic device, and a storage medium.

BACKGROUND

Currently, an image style transformation is a relatively common image processing method, for example, transforming a portrait image into a cartoon image.

In the related art, since most of training data of style transformation images are light-colored skin, generated transformation images also have light-colored skin after performing face style transformation by a model generated through training. That is, the existing style transformation models process users having light-colored skin, and use scope of the models may be limited.

SUMMARY

The first aspect of the disclosure provides an image processing method. The method includes: performing skin color recognition on a face image to be processed to determine a target skin color of a face contained in the face image; obtaining a reference transformation image corresponding to the face image by processing the face image using any style transfer model in response that a style transfer model set does not include a style transfer model corresponding to the target skin color; obtaining a hue value, a saturation value, and a lightness value of each pixel in the reference transformation image by parsing the reference transformation image; determining a target region in the reference transformation image based on the hue value, the saturation value, and the lightness value of each pixel in the reference transformation image; and obtaining a target transformation image matching the target skin color by adjusting a hue value, a saturation value, and a lightness value of each pixel in the target region based on the target skin color.

The second aspect of the disclosure provides an electronic device. The electronic device includes: at least one processor and a memory communicatively coupled to the at least one processor. The memory stores instructions executable by the at least one processor, and when the instructions are executed by the at least one processor, the at least one processor executes the image processing method according to the first aspect.

The third aspect of the disclosure provides a non-transitory computer-readable storage medium storing computer instructions, the computer instructions are configured to make a computer to execute the image processing method according to embodiments of the first aspect.

Additional effects of the above optional manners will be described below in combination with specific embodiments.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications may be made to the embodiments described herein without departing from the scope and spirit of the disclosure. For clarity and conciseness, descriptions of well-known functions and structures are omitted in the following description.

An image processing method, an image processing apparatus, an electronic device, and a storage medium according to the embodiments of the disclosure are described with reference to the drawings.

Figure 1:
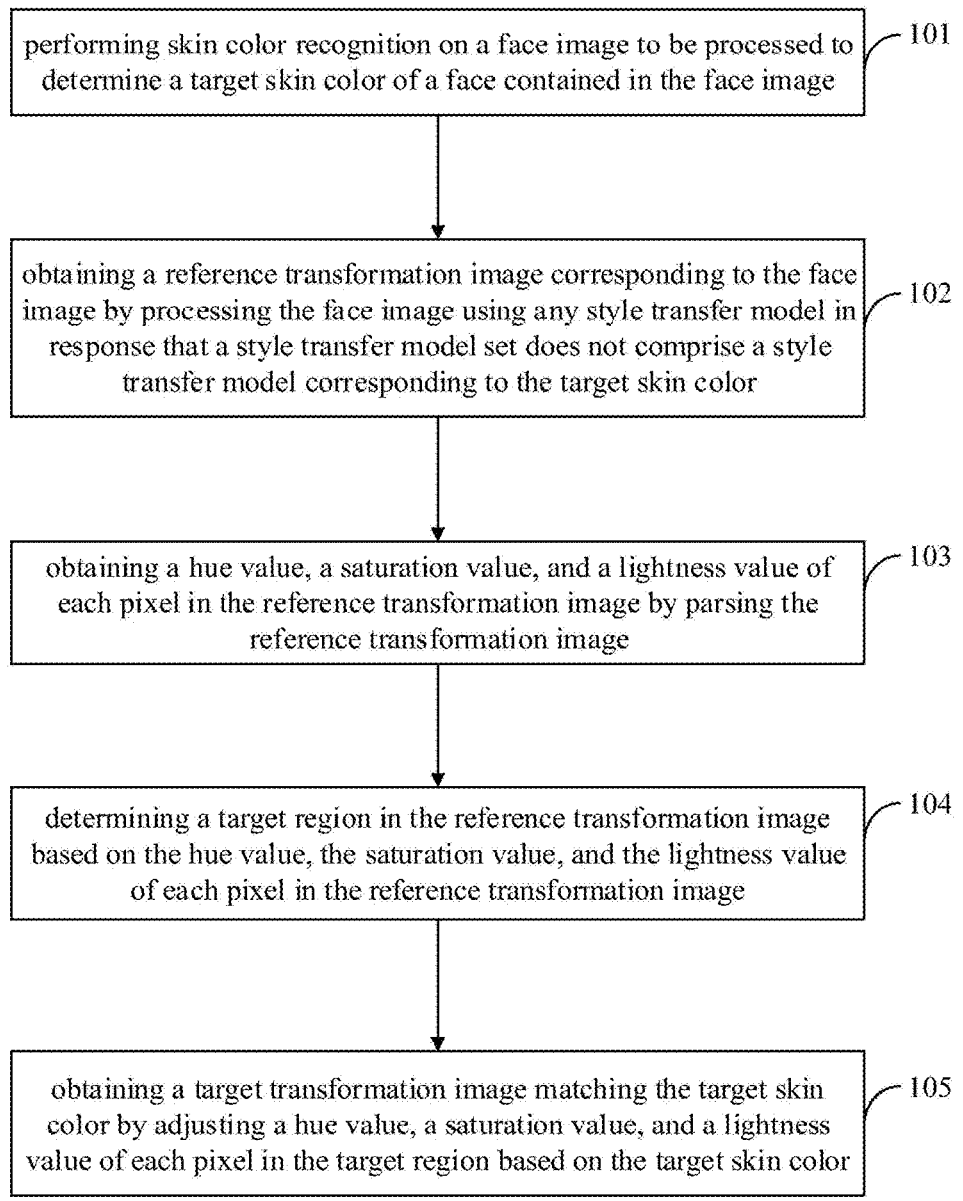
FIG. 1 is a flowchart of an image processing method according to embodiments of the disclosure.

FIG. 1 is a flowchart of an image processing method according to embodiments of the disclosure.

The image processing method according to embodiments of the disclosure may be executable by an image processing apparatus according to embodiments of the disclosure. The apparatus may be configured in an electronic device to adjust hue values, saturation values, and lightness values of pixels in a target region of a reference transformation image based on skin color of a face in a face image to be processed, so that skin color of a face in a target transformation image is matched with the skin color of the face in the face image to be processed.

As illustrated in FIG. 1, the method processing method includes the following.

At block 101, skin color recognition is performed on a face image to be processed to determine a target skin color of a face contained in the face image.

In some embodiments, the face image to be processed may be a face image taken by a camera of the electronic device, or a face image extracted from a captured image, or a face image extracted from a video frame of a video.

When the skin color recognition is performed, face recognition is performed to determine a face region, a pixel value of each pixel in the face region is obtained, and an averaged pixel value of all pixels in the face region is calculated. A pixel value range where the averaged pixel value of all pixels in the face region of the face image to be processed currently may be determined based on preset pixel value ranges corresponding to various skin color, so that the skin color corresponding to the determined pixel value range of all pixels is determined as the skin color of the face contained in the face image to be processed, i.e., the target skin color.

Alternatively, the target skin color of the face contained in the face image may be determined based on information input by the user on the skin color of the face image to be processed.

Alternatively, a pre-trained skin color recognition model is configured to perform the skin color recognition on the face image to be processed to determine the target skin color of the face contained in the face image.

At block 102, a reference transformation image corresponding to the face image is obtained by processing the face image using any style transfer model in response that a style transfer model set does not include a style transfer model corresponding to the target skin color.

In some embodiments, the style transfer model set includes a style transfer model corresponding to at least one skin color. The style transfer model corresponding to a certain skin color is configured to convert a face image containing a face of the skin color into another image of the same skin color in a different style, such as a cartoon image. For example, the style transfer model corresponding to skin color A converts a face image of skin color A into a cartoon image, and the skin color of the cartoon image is the same as or close to skin color A.

After obtaining the target skin color of the face contained in the face image to be processed, it is determined whether the style transfer model set includes the style transfer model corresponding to the target skin color based on a correspondence between each style transfer model in the style transfer model set and the corresponding skin color. If the style transfer model corresponding to the target skin color is included in the style transfer model set, the face image is processed by using the style transfer model to obtain the target transformation image matching with the target skin color. If the style transfer model set does not include the style transfer model corresponding to the target skin color, any style transfer model is used to process the face image to obtain the transformation image corresponding to the face image, which is referred to as the reference transformation image.

For example, the skin color of the face contained in the face image to be processed is black, and the style transfer model set does not include the style transfer model corresponding to black. Since training data of light colors is relatively high, and the style transfer model set includes the style transfer models corresponding to the light colors, the face image to be processed is processed by using the style transfer model corresponding to the light color to obtain the reference transformation image with light skin color.

At block. 103, a hue value, a saturation value, and a lightness value of each pixel in the reference transformation image are obtained by parsing the reference transformation image.

In order to facilitate adjustment, in some embodiments, the reference transformation image is converted to a HSV (Hue, Saturation, Value) color space, and the hue value, the saturation value, and the lightness value of each pixel in the reference transformation image are obtained. The hue value represents color. The saturation value represents a degree to which the color is close to the spectral color. The lightness value represents a brightness of the color.

At block 104, a target region in the reference transformation image is determined based on the hue value, the saturation value, and the lightness value of each pixel in the reference transformation image.

In applications, eyes, noses, and mouths are roughly the same in the transformation images of different skin colors. Therefore, in some embodiments, only the skin color of the face and the skin color exposed on the body are adjusted, and no adjustments are made to eyes, noses and mouths.

In a specific implementation, face detection is performed to determine regions where eyes, a mouth and a nose are located, and regions other than these regions in the face image are determined as the target region.

Therefore, it may be seen that the target region may include regions in the face region in the reference transformed image, which may not include regions such as the eyes, nose, mouth, and an exposed body.

At block 105, a target transformation image matching the target skin color is obtained by adjusting a hue value, a saturation value, and a lightness value of each pixel in the target region based on the target skin color.

In some embodiments, the hue value, the saturation value, and the lightness value corresponding to the target skin color are determined based on the target skin color. The hue value, the saturation value, and the lightness value of each pixel in the target region are adjusted to the hue value, the saturation value, and the lightness value corresponding to the target skin color, so as to obtain the target transformation image that matches the target skin color.

Therefore, when there is no style transfer model corresponding to the skin color of the face image to be processed, the existing style transfer model may be used to process the face image to obtain the reference transformation image, and the target region in the reference transformation image is adjusted to obtain the transformation image that matches the skin color of the face image to be processed.

With the image processing method provided in the embodiments of the disclosure, the skin color recognition is performed on the face image to be processed to determine the target skin color of the face contained in the face image. The reference transformation image corresponding to the face image is obtained by processing the face image using any style transfer model in response that the style transfer model set does not include the style transfer model corresponding to the target skin color. The hue value, the saturation value, and the lightness value of each pixel in the reference transformation image are obtained by parsing the reference transformation image. The target region in the reference transformation image is determined based on the hue value, the saturation value, and the lightness value of each pixel in the reference transformation image. The target transformation image matching the target skin color is obtained by adjusting the hue value, the saturation value, and the lightness value of each pixel in the target region based on the target skin color. Therefore, when the style transfer model set does not include the style transfer model corresponding to the target skin color, the existing style transfer model may be used to adjust the hue value, the saturation value, and the lightness value of each pixel in the target region of the reference transformation image based on the skin color of the face in the face image to be processed, so that the skin color of the target transformation image matches the skin color of the face in the face image to be processed, and the style transformation processing may be performed on users of various skin colors, and the application range is expanded.

In order to improve the accuracy of the target region, in some embodiments of the disclosure, the target region in the reference transformation image is determined by the following manner.

In detail, the range corresponding to the hue value, the range corresponding to the saturation value, and the range corresponding to the brightness value, of the face skin color in the reference transformation image may be preset, which may be that the hue value corresponding to a first range, the saturation value corresponding to a second range, and the brightness value corresponding to a third range. After obtaining the reference transformation image, a pixel in the reference transformation image, having the hue value is in the first range, the saturation value is in the second range, and the lightness value is in the third range, is determined based on the hue value, the saturation value, and the lightness value of each pixel in the reference transformation image as the pixel in the target region. That is, the region including these pixels is the target region.

Alternatively, an upper boundary and a lower boundary, of the hue value, the saturation value, and the lightness value, corresponding to the face skin color in the reference transformation image, may be determined. A region between the upper boundary and the lower boundary is defined as the target region. For example, the upper boundary is H,S,V=[10, 15, 210], and the lower boundary is H,S,V=[25, 95, 255], and a region between the two boundaries in the reference transformation image is determined as the target region.

In some embodiments, when determining the target region in the reference transformation image based on the hue value, the saturation value, and the lightness value of each pixel in the reference transformation image, the pixel in the reference transformation image, having the hue value in the first range, the saturation value in the second range, and the brightness value in the third range, is determined as the pixel in the target region. Therefore, by determining the target region based on the hue range, the saturation range, and the lightness range, the accuracy of the target region is improved.

Figure 2:
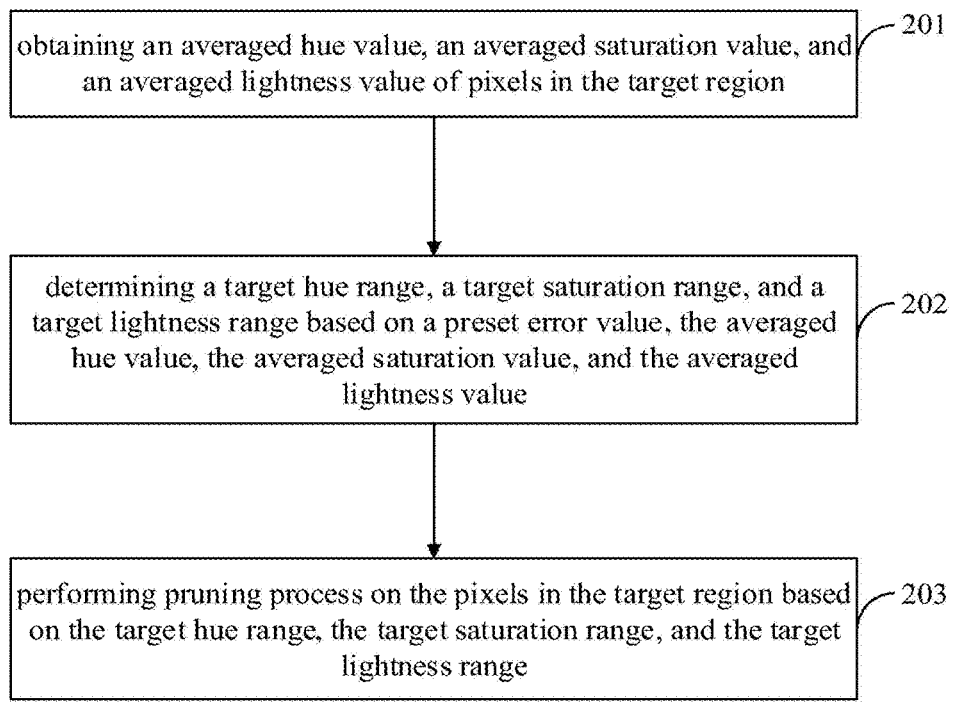
FIG. 2 is a flowchart of another image processing method according to embodiments of the disclosure.

In order to further improve the accuracy of the target region, in some embodiments of the disclosure, after determining the pixel in the target region of the reference transformation image based on the hue value range, the saturation value range and the lightness value range, pixels in the target region are further pruned to obtain a more accurate target region. FIG. 2 is a flowchart of another image processing method according to embodiments of the disclosure.

As illustrated in FIG. 2, after determining the pixel in the reference transformation image, having the hue value in the first range, the saturation value in the second range, and the brightness value in the third range, as the pixel in the target region, the method includes the following.

At block 201, an averaged hue value, an averaged saturation value, and an averaged lightness value of pixels in the target region are obtained.

In some embodiments, a sum of hue values of all pixels in the target region is calculated based on the hue value of each pixel in the target region, and then the sum of the hue values is divided by the number of pixels in the target region, to obtain the averaged hue value of each pixel in the target region.

Similarly, a sum of saturation values of all pixels in the target region is calculated based on the saturation value of each pixel in the target region, and then the sum of the saturation values is divided by the number of pixels in the target region to obtain the averaged saturation value.

Similarly, a sum of brightness values of all pixels in the target region is calculated based on the brightness value of each pixel in the target region, and then the sum of the brightness values is divided by the number of pixels in the target region to obtain the averaged brightness value.

At block 202, a target hue range, a target saturation range, and a target lightness range are determined based on a preset error value, the averaged hue value, the averaged saturation value, and the averaged lightness value.

In some embodiments, the error value may be preset, and the error value includes a hue error value, a saturation error value, and a lightness error value. The target hue range is determined based on the hue error value and the averaged hue value. The averaged hue value is within the target hue range. The target saturation range is determined based on the saturation error value and the averaged saturation value. The averaged saturation value is within the target saturation range. The target lightness range is determined based on the lightness error value and the averaged lightness value. The averaged lightness value is within the target lightness range.

The upper and lower fluctuation ranges of the averaged hue value, the averaged saturation value, and the averaged lightness value correspond to the hue error value, the saturation error value, and the lightness error value respectively, that is, a difference between an upper limit and a lower limit of each of the target hue range, the target saturation range, and the target lightness range is the corresponding error value.

For example, a difference obtained by subtracting one-half of the hue error value from the averaged hue value is determined as the lower limit of the target hue range, and a sum of the averaged hue value plus one-half of the hue error value is determined as the upper limit of the target hue range. Similarly, a difference obtained by subtracting one-half of the saturation error value from the averaged saturation value is determined as the lower limit of the target saturation range, and a sum of the averaged saturation value and one-half of the saturation error value is determined as the upper limit of the target saturation range. Similarly, a difference obtained by subtracting one-half of the lightness error value from the averaged lightness value is determined as the lower limit of the target lightness range, and a sum of the averaged lightness value and one-half of the lightness error value is determined as the upper limit of the target brightness range.

For example, a difference obtained by subtracting two-thirds of the hue error value from the averaged hue value is determined as the lower limit of the target hue range, and a sum of the averaged hue value and one third of the hue error value is determined as the upper limit of the target hue range.

For example, the preset error value is $(h_A, s_A, v_A)$ $h_A$ represents the hue error value, $s_A$ represents the saturation error value, $v_A$ represents the lightness error value, $\bar{h}$ represents the averaged hue value, $\bar{s}$ represents the averaged saturation value, and $\bar{v}$ represents the averaged lightness value. The target hue range is $$\left[\bar{h} - \frac{1}{2}h_\Delta, \bar{h} + \frac{1}{2}h_\Delta\right],$$

the target saturation range is $$\left[\bar{s} - \frac{1}{2}s_\Delta, \bar{s} + \frac{1}{2}s_\Delta\right],$$

and the target lightness range is $$\left[\bar{v} - \frac{1}{2}v_\Delta, \bar{v} + \frac{1}{2}v_\Delta\right].$$

It should be noted that the above manners for determining the upper and lower limits of the target hue range, the target saturation range, and the target brightness range is an example.

At block 203, pruning process is performed on the pixels in the target region based on the target hue range, the target saturation range, and the target lightness range.

After determining the target hue range, the target saturation range, and the target lightness range, a pixel in the target region, having a hue value in the target hue range, a saturation value in the target saturation range, and a lightness value in the target lightness range, is determined as the pixel in the target region. Therefore, some pixels in the target region are filtered out based on the target hue range, the target saturation range, and the target brightness range, and a new target region that needs to be adjusted is determined.

After determining the new target region, a hue value, a saturation value, and a lightness value of each pixel in the new target region are adjusted based on the target skin color of the face contained in the face image to be processed, so that the skin color of the face in the adjusted target transformation image matches the target skin color.

In applications, in the reference transformation image, it is possible that hair around the face and shadows caused by the light on the face region also belong to the target region. Therefore, after determining the target region, by determining the target hue range, the target saturation range, and the target brightness range, the pixels in the target region are pruned based on the target hue range, the target saturation range, and the target brightness range. The region where the reserved pixels are located is determined as the new target region, and the hue value, the saturation value and the lightness value of each pixel in the new target region are adjusted.

Figure 3:
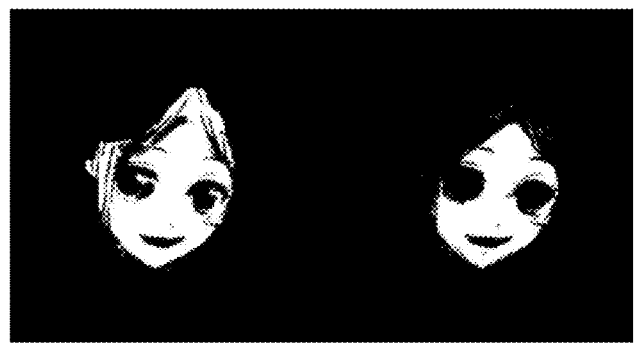
FIG. 3 is a schematic diagram of effects before and after pruning processing according to embodiments of the disclosure.

FIG. 3 is a schematic diagram of effects before and after pruning processing according to embodiments of the disclosure. In FIG. 3, the left side is a schematic diagram of the face image before the pruning process, and the right side is a schematic diagram of the face image after the pruning process. It may be seen from FIG. 3 that after the pruning process, the face region where the skin color needs to be adjusted is more accurate.

In some embodiments, in the reference transformation image, each pixel in the target region, having the hue value in the first range, the saturation value in the second range, and the lightness value in the third range is determined as the pixel in the target region. The target hue range, the target saturation range, and the target lightness range are determined based on the preset error value, the averaged hue value, the averaged saturation value, and the averaged lightness value. Then, the pixels in the target region are pruned based on the target hue range, the target saturation range and the target lightness range, and the hue values, the saturation values, and the lightness values of the pixels retained after the pruning process are adjusted to obtain the target transformation image that matches the target skin color. Thus, by pruning the pixels in the target region, a more precise region where the skin color needs to be adjusted is obtained for skin color adjustment, and the image processing effect is further improved.

Figure 4:
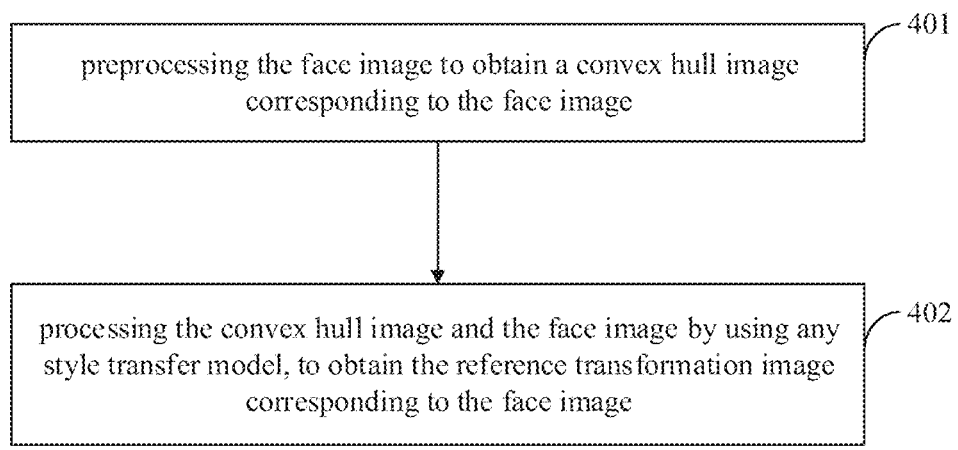
FIG. 4 is a flowchart of another image processing method according to embodiments of the disclosure.

In order to improve the effect of the reference transformation image, in some embodiments of the disclosure, the convex hull image of the face image to be processed may be used to obtain the reference transformation image through the style transfer model. FIG. 4 is a flowchart of another image processing method according to embodiments of the disclosure.

As illustrated in FIG. 4, obtaining the reference transformation image corresponding to the face image by processing the face image using any style transfer model includes the following.

At block 401, the face image is preprocessed to obtain a convex hull image corresponding to the face image.

In some embodiments, the face image may be preprocessed before using any style transfer model in the style transfer model set to process the face image to be processed.

In detail, key point detection is performed on the face image to obtain key point positions of facial features of the face, a convex hull graph of the facial features is obtained based on the key point positions, and different colors are added to the convex hull graph to obtain the convex hull image. The convex hull image represents positions and sizes of the facial features, and states of opening eyes, closing eyes, opening mouth, and closing mouth are represented through change of color.

Figure 5:
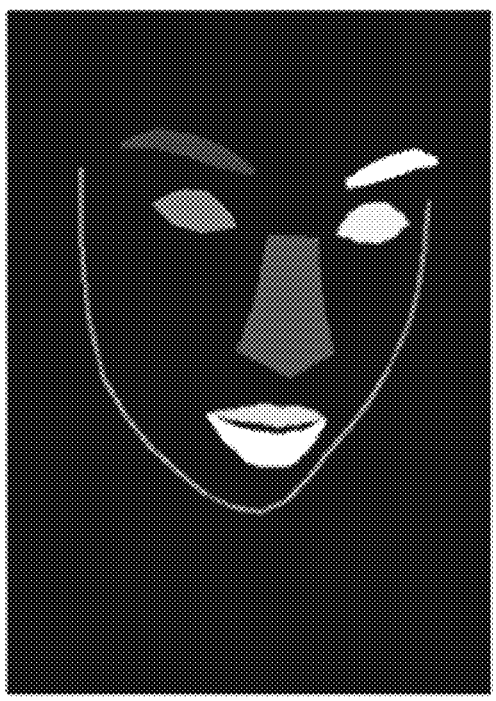
FIG. 5 is a schematic diagram of a convex hull image according to embodiments of the disclosure.

FIG. 5 is a schematic diagram of a convex hull image according to embodiments of the disclosure.

As may be seen from FIG. 5, the convex hull image includes eyebrows, nose, eyes, and mouth.

At block 402, the convex hull image and the face image are processed by using any style transfer model, to obtain the reference transformation image corresponding to the face image.

In some embodiments, the convex hull image and the face image are input into the selected style transfer model. In detail, the convex hull image and the face image are both RGB three-channel images, and a 6-dimensional matrix formed by the two kinds of images is input into the style transfer model. The style transfer model uses the convex hull image to accurately locate the facial features of the face in the face image, so that the style transfer model transforms the facial features in the face image to obtain the reference transformation image corresponding to the face image.

In some embodiments of the disclosure, when using any style transfer model to process the face image to obtain the reference transformation image corresponding to the face image, the face image may be preprocessed to obtain the convex hull image corresponding to the face image by preprocessing the face image. Then any style transfer model may be adopted to process the convex hull image and the face image to obtain the reference transformation image corresponding to the face image. Therefore, when using the style transfer model to process the face image, based on the convex hull image corresponding to the face image, the style transfer model may accurately locate the positions of the facial features in the face image based on the convex hull image, thereby improving the processing efficiency of the style transfer model and the effect of the reference transformation image.

The above embodiments describe that when the style transfer model set does not include the style transfer model corresponding to the skin color, any style transfer model in the style transfer model set may be used to process the face image to obtain the reference transformation image, and the skin color adjustment is performed on the reference transformation image to obtain the target transformation image that matches the skin color.

Figure 6:
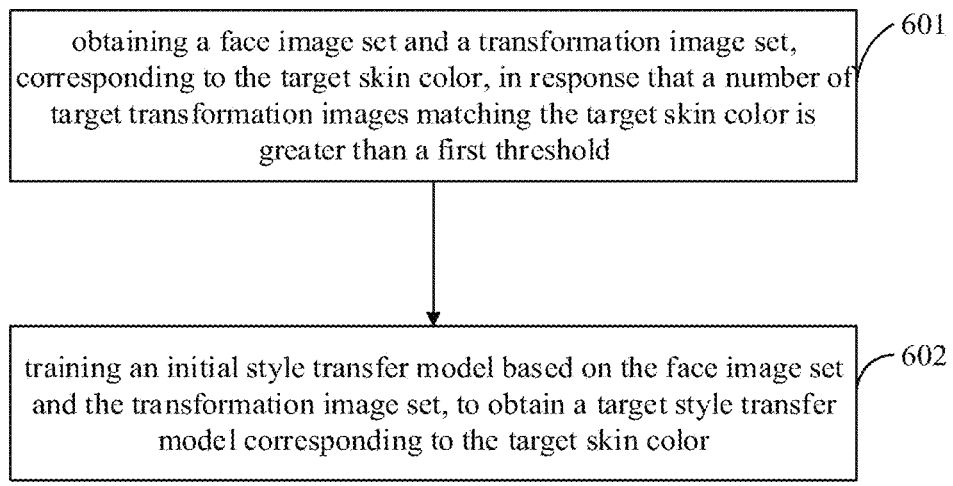
FIG. 6 is a flowchart of another image processing method according to embodiments of the disclosure.

In order to further improve the processing efficiency and effect of the face image of the target skin color, in some embodiments of the disclosure, the above method is adopted to process the face image of the target skin color to obtain a large number of transformation images of the target skin color. These face images and the transformation images are used to train the style transfer model corresponding to the target skin color, so as to use the style transfer model to process the face image of the target skin color. FIG. 6 is a flowchart of another image processing method according to embodiments of the disclosure.

As illustrated in FIG. 6, after obtaining the target transformation image matching the target skin color, the method further includes the following.

At block 601, a face image set and a transformation image set, corresponding to the target skin color, are obtained in response that a number of target transformation images matching the target skin color is greater than a first threshold.

In some embodiments, after obtaining the target transformation image matching the target skin color, it is determined whether the number of target transformation images matching the target skin color is greater than the first threshold. If the number of target transformation images matching the target skin color is greater than the first threshold, face images of the target skin color are used to form the face image set, and target transformation images corresponding to the face images are used to form the transformation image set.

At block 602, an initial style transfer model is trained based on the face image set and the transformation image set, to obtain a target style transfer model corresponding to the target skin color.

In some embodiments, the initial style transfer model may be a confrontation network, including a generator and a discriminator.

During specific training, in order to reduce difficulty of model training, the face images in the face image set may be preprocessed to obtain the convex hull images corresponding to the face images.

Since the convex hull image represents the positions and sizes of the facial features, and the states of opening eyes, closing eyes, opening mouth, and closing mouth through color changes, it is equivalent to that the initial style transfer model directly knows current states of opening eyes and opening mouth, without letting the model learn passively. In this way, the model generation effect and convergence speed are significantly improved.

After obtaining the convex hull image of the face image, the convex hull image and the face image are input to the generator to generate a reference image, such as a two-dimensional image. Afterwards, the reference image is input to the discriminator, so that the probability of discriminating that the reference image is a real image by the discriminator is called a first probability for distinguishing. Then, the generator and the discriminator are modified based on the difference between the first probability and 0.

Since the reference image is an image generated by the generator, the probability that the reference image belongs to a real image is 0%. It may be seen that the greater the first probability, the higher the probability that the reference image is recognized as the real image, but if the reference image is the generated image, it indicates that accuracy of the current discriminator's judgment is worse. Therefore, the discriminator is corrected. The smaller the probability, the lower the probability that the reference image is recognized as the real image, and the worse the effect of the transformation image generated by the generator, the generator is corrected.

Meanwhile, the transformation images in the transformation image set are input to the discriminator, and the discriminator determines whether the transformation images are real or are generated by the generator. In order to facilitate the determination, the transformation image in the transformation image set may be input into the discriminator, and the probabilities output by the discriminator may be called a second probability. Afterwards, the discriminator is modified based on a difference between the second probability and 0. Since the image in the transformation image set is generated by the generator, the greater the second probability, the worse the determining effect of the discriminator, and the discriminator should be corrected.

In specific implementation, deep learning may be performed on the initial style transfer model to obtain the style transfer model corresponding to the target skin color.

After obtaining the style transfer model corresponding to the target skin color, the style transfer model is added to the style transfer model set. If the skin color of the face contained in the face image to be processed is the target skin color, the face image is processed by the style transfer model corresponding to the target skin color to obtain the corresponding transformation image.

For example, by using the face image set and the transformation image set, the style transfer model corresponding to the dark skin color is obtained by training. In the application scenario of video-level two-dimensional images, for the face image detected in the video, the skin color recognition is performed to determine the skin color of the face in the face image. If the skin color of the face is dark, the style transfer model corresponding to the dark skin color is called from the style transfer model set to process the face image to obtain the two-dimensional image of the dark skin color. If the skin color of the human face is light, the style transfer model corresponding to the light skin color is called to process the face image to obtain the two-dimensional image corresponding to the light skin color.

Meanwhile, the detected human face is tracked, because the tracking time is short, and time-consuming skin color recognition for each frame may be avoided. When losing track, the skin color of the detected face is re-identified, and the corresponding model for processing is called. Therefore, when generating a video-level two-dimensional image, skin color recognition is adaptively performed, and a two-dimensional image corresponding to the skin color is generated.

When the video-level image style is changed, it may be necessary to switch between multiple style transfer models, which requires high GPU memory usage for the style transfer model.

For example, there was one style transfer model before, and a memory usage was 1G. After adding another style transfer model, the memory usage increases to 2G. Therefore, in order to reduce the memory usage, the style transfer model is further quantified. If the style transfer model may be previously performed with storage and calculation based on float32, float32 may be changed to float16. Then, fine-tuning is further performed based on a float16 model to ensure that the image processing effect does not decrease. As a result, through high precision quantification, storage of the style transfer model may be reduced by a factor of two, and all processing may be calculated based on float16, reducing the video memory usage by half.

In some embodiments of the disclosure, after obtaining the target transformation image matching the target skin color, if the number of target transformation images matching the target skin color is greater than the first threshold, the face image set and the transformation image set corresponding to the target skin color are obtained, and the initial style transfer model is trained based on the face image set and the transformation image set, to obtain the target style transfer model corresponding to the target skin color. Therefore, when the skin color of the face image to be processed is the target skin color, the target style transfer model is used to process the face image to obtain the transformation image of the target skin color, thereby improving processing efficiency and processing effect of the face image of the target skin color.

In applications, generally, the face image has a certain background. In order to improve the image processing effect, in some embodiments of the disclosure, before performing the skin color recognition on the face image to be processed, a face segmentation model is used to perform face segmentation on an image to be processed, to obtain a face region and a background region, and to obtain the face region to be processed from the image to be processed.

Alternatively, a face detection algorithm is adopted to locate the face position from the image to be processed to obtain a face position frame, and the face region is cut out from the image to be processed and the background region is discarded based on the face position frame.

Further, when obtaining the face image to be processed, images with a face region having a size smaller than a preset size are filtered out. The style transfer model generally specifies the size of the processed image.

For example, when the style transfer model processes the face image, the face image needs to be scaled to a size of 256*256 pixels, so that face images with a face size less than 100 are filtered out. If the face region is too small, the human face will be blurred after enlarging the image, which affects the processing effect.

In addition, before performing face segmentation on the image to be processed, the image may also be filtered based on the image size, to obtain the image to be processed whose size satisfies the requirements.

For example, if the image needs to be scaled to a size of 256*256 and input into the style transfer model for processing, images with a size smaller than 256 are filtered out. If the initial image to be processed is smaller than 256, the region of the face image is smaller than 256. Then, if the face image to be processed is enlarged, the image will be blurred and the model processing effect will be affected.

In some embodiments of the disclosure, before performing the skin color recognition on the face image to be processed, the face segmentation model may also be used to perform the face segmentation on the image to be processed, to obtain the face image to be processed. Therefore, by performing the face segmentation on the image to be processed, the background in the image to be processed is discarded, and the face image is obtained. When the face image is processed, the image processing effect is improved.

Figure 7:
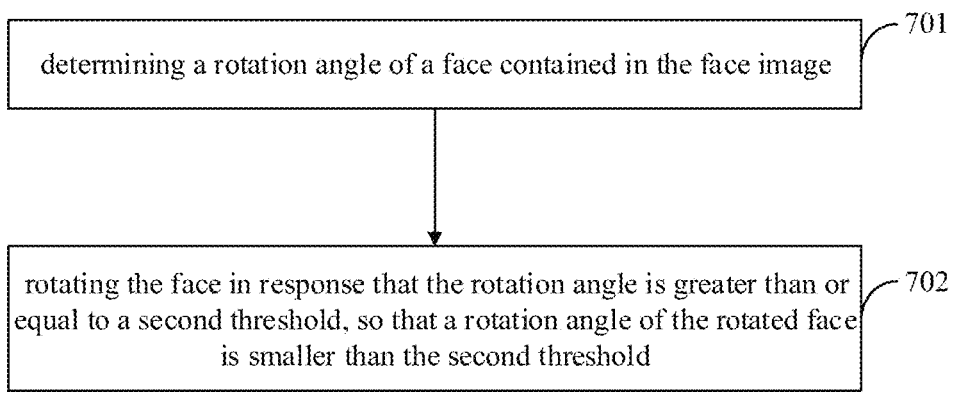
FIG. 7 is a flowchart of another image processing method according to embodiments of the disclosure.

In applications, the human face in the human face image may not be upright, and there is a certain rotation angle. In order to facilitate processing, in some embodiments of the disclosure, after the face image is obtained from the image to be processed through the face segmentation, the face with a larger rotation angle may also be rotated. FIG. 7 is a flowchart of another image processing method according to embodiments of the disclosure.

As illustrated in FIG. 7, after performing the face segmentation on the image to be processed by using the face segmentation model to obtain the face image to be processed, the method includes the following.

A block 701, a rotation angle of a face contained in the face image is determined.

In applications, when a person is taking a selfie or being photographed, a head of the person may be tilted to the left or to the right, resulting in a certain rotation angle of the face. In some embodiments, the rotation angle of a central axis of the face in the face image relative to a vertical direction is detected.

A block 702, the face is rotated in response that the rotation angle is greater than or equal to a second threshold, so that a rotation angle of the rotated face is smaller than the second threshold.

In some embodiments, it is determined whether the rotation angle of the face in the face image is greater than or equal to the second threshold. If the rotation angle is greater than or equal to the second threshold, the human face is rotated in the vertical direction, so that the rotation angle of the human face after rotation is smaller than the second threshold. In detail, the human face may be rotated at least, and the angle of the difference between the rotation angle of the human face and the second threshold is detected at block 701.

The second threshold may be set according to actual needs.

For example, if the second threshold is 45 degrees, and the rotation angle of the face in the face image is 70 degrees, 70 degrees−45 degrees=25 degrees, the face needs to be rotated at least 25 degrees to make the angle of the rotated face less than 45 degrees. In applications, in order to facilitate processing, the rotation angle of the rotated face may be set to 0.

After the face in the face image is rotated, the skin color recognition is performed on the face image, to determine the target skin color and other subsequent processing.

In some embodiments of the disclosure, after using the face segmentation model to perform the face segmentation on the image to be processed to obtain the face image to be processed, the rotation angle of the face image is determined. If the rotation angle is greater than or equal to the second threshold, the face is rotated, so that the rotation angle of the rotated face is smaller than the second threshold. Therefore, after the face image to be processed is obtained through the face segmentation, if the rotation angle of the face in the face image is large, the rotation processing of the face is performed, the rotation angle of the face to be rotated satisfies the conditions, and the face image is processed again, thereby improving the image processing effect.

Figure 8:
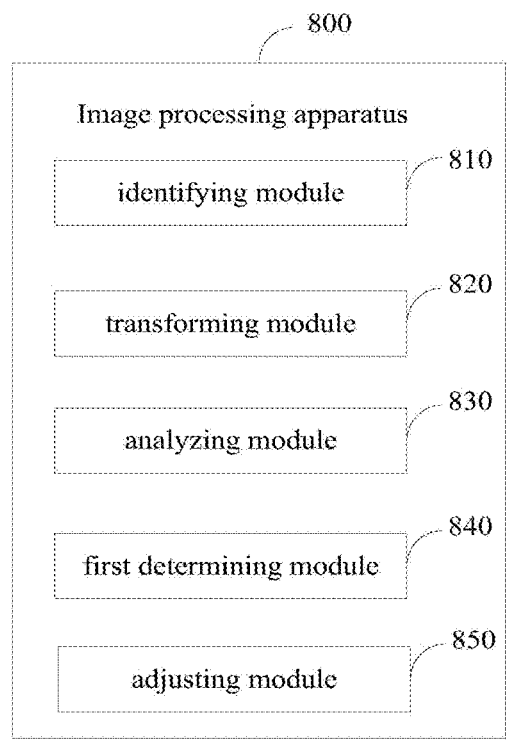
FIG. 8 is a block diagram of an image processing apparatus according to embodiments of the disclosure.

In order to implement the above embodiments, the embodiments of the disclosure also provide an image processing apparatus. FIG. 8 is a schematic diagram of an image processing apparatus 800 according to embodiments of the disclosure.

As illustrated in FIG. 8, the image processing apparatus 800 includes: an identifying module 810, a transforming module 820, a parsing module 830, a first determining module 840 and an adjusting module 850.

The identifying module 810 is configured to perform skin color recognition on a face image to be processed to determine a target skin color of a face contained in the face image.

The transforming module 820 is configured to obtain a reference transformation image corresponding to the face image by processing the face image using any style transfer model in response that a style transfer model set does not include a style transfer model corresponding to the target skin color.

The parsing module 830 is configured to obtain a hue value, a saturation value, and a lightness value of each pixel in the reference transformation image by parsing the reference transformation image.

The first determining module 840 is configured to determine a target region in the reference transformation image based on the hue value, the saturation value, and the lightness value of each pixel in the reference transformation image.

The adjusting module 850 is configured to obtain a target transformation image matching the target skin color by adjusting a hue value, a saturation value, and a lightness value of each pixel in the target region based on the target skin color.

In a possible implementation, the first determining module 840 is configured to: determine a pixel in the reference transformation image, having a hue value in a first range, a saturation value in a second range, and a brightness value in a third range, as a pixel in the target region.

In a possible implementation, the apparatus further includes: a first obtaining module, a second determining module and a pruning module.

The first obtaining module is configured to obtain an averaged hue value, an averaged saturation value, and an averaged lightness value of pixels in the target region.

The second determining module is configured to determine a target hue range, a target saturation range, and a target lightness range based on a preset error value, the averaged hue value, the averaged saturation value, and the averaged lightness value. The pruning module is configured to perform pruning process on the pixels in the target region based on the target hue range, the target saturation range, and the target lightness range.

In a possible implementation, the transforming module 820 includes: a first processing unit and a second processing unit.

The first processing unit is configured to preprocess the face image to obtain a convex hull image corresponding to the face image.

The second processing unit is configured to preprocess the convex hull image and the face image by using any style transfer model, to obtain the reference transformation image corresponding to the face image.

In a possible implementation, the apparatus further includes: a second obtaining module and a training module.

The second obtaining module is configured to obtain a face image set and a transformation image set, corresponding to the target skin color, in response that a number of target transformation images matching the target skin color is greater than a first threshold.

The training module is configured to train an initial style transfer model based on the face image set and the transformation image set, to obtain a target style transfer model corresponding to the target skin color.

In a possible implementation, the apparatus further includes: a segmenting module, configured to perform face segmentation on an image to be processed by using a face segmentation model to obtain the face image to be processed.

In a possible implementation, the apparatus further includes: a third determining module and a rotating module.

The third determining module is configured to determine a rotation angle of a face contained in the face image.

The rotating module is configured to rotate the face in response that the rotation angle is greater than or equal to a second threshold, so that a rotation angle of the rotated face is smaller than the second threshold.

It should be noted that the explanation of the above embodiments of the image processing method is also applied to the image processing apparatus of this embodiment, which is not repeated here.

With the image processing apparatus provided in the embodiments of the disclosure, the skin color recognition is performed on the face image to be processed to determine the target skin color of the face contained in the face image. The reference transformation image corresponding to the face image is obtained by processing the face image using any style transfer model in response that the style transfer model set does not include the style transfer model corresponding to the target skin color. The hue value, the saturation value, and the lightness value of each pixel in the reference transformation image are obtained by parsing the reference transformation image. The target region in the reference transformation image is determined based on the hue value, the saturation value, and the lightness value of each pixel in the reference transformation image. The target transformation image matching the target skin color is obtained by adjusting the hue value, the saturation value, and the lightness value of each pixel in the target region based on the target skin color. Therefore, when the style transfer model set does not include the style transfer model corresponding to the target skin color, the existing style transfer model may be used to adjust the hue value, the saturation value, and the lightness value of each pixel in the target region of the reference transformation image based on the skin color of the face in the face image to be processed, so that the skin color of the target transformation image matches the skin color of the face in the face image to be processed, and the style transformation processing may be performed on users of various skin colors, and the application range is expanded.

According to the embodiments of the disclosure, the disclosure also provides an electronic device and a readable storage medium.

Figure 9:
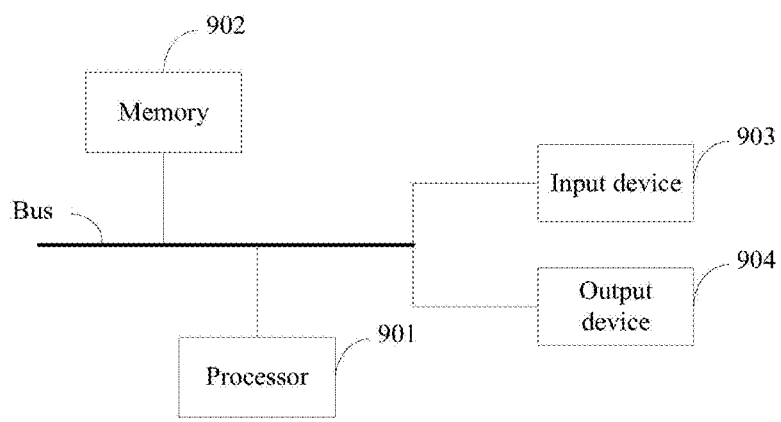
FIG. 9 is a block diagram of an electronic device used to implement an image processing method according to embodiments of the disclosure.

FIG. 9 is a block diagram of an electronic device used to implement the image processing method according to the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 901, a memory 902, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 901 is taken as an example in FIG. 9.

The memory 902 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 902 is configured to store non-transitory software programs, non-transitory computer executable programs and modules, such as program instructions/modules (for example, the identifying module 810, the transforming module 820, the parsing module 830, the first determining module 840, and the adjusting module 850) corresponding to the method in the embodiments of the disclosure. The processor 901 executes various functional applications and data processing of the electronic device by running non-transitory software programs, instructions, and modules stored in the memory 902, that is, implementing the method in the foregoing method embodiments.

The memory 902 may include a storage program region and a storage data region, where the storage program region may store an operating system and application programs required for at least one function. The storage data region may store data created according to the use of the electronic device for implementing the method. In addition, the memory 902 may include a high-speed random access memory, and a non-transitory memory, such as at least one magnetic disk storage device, a flash memory device, or other non-transitory solid-state storage device. In some embodiments, the memory 902 may optionally include a memory remotely disposed with respect to the processor 901, and these remote memories may be connected to the electronic device for implementing the method through a network. Examples of the above network include, but are not limited to, the Internet, an intranet, a local region network, a mobile communication network, and combinations thereof.

The electronic device used to implement the method may further include: an input device 903 and an output device 904. The processor 901, the memory 902, the input device 903, and the output device 904 may be connected through a bus or in other manners. In FIG. 9, the connection through the bus is taken as an example.

The input device 903 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and technologies described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local region network (LAN), wide region network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system to solve management difficulty and weak business scalability defects of traditional physical hosts and Virtual Private Server (VPS) services.

According to the technical solution of the embodiments of the disclosure, when the style transfer model set does not include the style transfer model corresponding to the target skin color, the existing style transfer models are used to adjust a hue value, a saturation value, and a lightness value of each pixel in the target region of the reference transformation image based on the skin color of the face in the face image to be processed, so that the skin color of the target transformation image matches the skin color of the face in the face image to be processed, and the style transformation processing may be performed on users of various skin colors, and the application range is expanded.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. An image processing method, comprising:
    performing skin color recognition on a face image to be processed to determine a target skin color of a face contained in the face image;
    obtaining a reference transformation image corresponding to the face image by processing the face image using any style transfer model in response that a style transfer model set does not comprise a style transfer model corresponding to the target skin color;
    obtaining a hue value, a saturation value, and a lightness value of each pixel in the reference transformation image by parsing the reference transformation image;
    determining a target region in the reference transformation image based on the hue value, the saturation value, and the lightness value of each pixel in the reference transformation image; and
    obtaining a target transformation image matching the target skin color by adjusting a hue value, a saturation value, and a lightness value of each pixel in the target region based on the target skin color.

2. The method according to claim 1, wherein determining the target region in the reference transformation image based on the hue value, the saturation value, and the lightness value of each pixel in the reference transformation image, comprises:
    determining a pixel in the reference transformation image, having a hue value in a first range, a saturation value in a second range, and a brightness value in a third range, as a pixel in the target region.

3. The method according to claim 2, further comprising:
    obtaining an averaged hue value, an averaged saturation value, and an averaged lightness value of pixels in the target region;
    determining a target hue range, a target saturation range, and a target lightness range based on a preset error value, the averaged hue value, the averaged saturation value, and the averaged lightness value; and
    performing pruning process on the pixels in the target region based on the target hue range, the target saturation range, and the target lightness range.

4. The method according to claim 1, wherein obtaining the reference transformation image corresponding to the face image by processing the face image using any style transfer model, comprises:
    preprocessing the face image to obtain a convex hull image corresponding to the face image; and
    processing the convex hull image and the face image by using any style transfer model, to obtain the reference transformation image corresponding to the face image.

5. The method according to claim 1, further comprising:
    obtaining a face image set and a transformation image set, corresponding to the target skin color, in response that a number of target transformation images matching the target skin color is greater than a first threshold; and
    training an initial style transfer model based on the face image set and the transformation image set, to obtain a target style transfer model corresponding to the target skin color.

6. The method according to claim 1, further comprising:
    performing face segmentation on an image to be processed by using a face segmentation model to obtain the face image to be processed.

7. The method according to claim 6, further comprising:
    determining a rotation angle of a face contained in the face image; and
    rotating the face in response that the rotation angle is greater than or equal to a second threshold, so that a rotation angle of the rotated face is smaller than the second threshold.

8. An electronic device, comprising:
    at least one processor; and
    a memory communicatively connected to the at least one processor; wherein,
    the memory is configured to store instructions executable by the at least one processor, and when the instructions are executed by the at least one processor, the at least one processor is caused to perform:
    performing skin color recognition on a face image to be processed to determine a target skin color of a face contained in the face image;
    obtaining a reference transformation image corresponding to the face image by processing the face image using any style transfer model in response that a style transfer model set does not comprise a style transfer model corresponding to the target skin color;
    obtaining a hue value, a saturation value, and a lightness value of each pixel in the reference transformation image by parsing the reference transformation image;
    determining a target region in the reference transformation image based on the hue value, the saturation value, and the lightness value of each pixel in the reference transformation image; and
    obtaining a target transformation image matching the target skin color by adjusting a hue value, a saturation value, and a lightness value of each pixel in the target region based on the target skin color.

9. The electronic device according to claim 8, wherein determining the target region in the reference transformation image based on the hue value, the saturation value, and the lightness value of each pixel in the reference transformation image, comprises:
    determining a pixel in the reference transformation image, having a hue value in a first range, a saturation value in a second range, and a brightness value in a third range, as a pixel in the target region.

10. The electronic device according to claim 9, wherein when the instructions are executed by the at least one processor, the at least one processor is further caused to perform:
obtaining an averaged hue value, an averaged saturation value, and an averaged lightness value of pixels in the target region;
determining a target hue range, a target saturation range, and a target lightness range based on a preset error value, the averaged hue value, the averaged saturation value, and the averaged lightness value; and
performing pruning process on the pixels in the target region based on the target hue range, the target saturation range, and the target lightness range.

11. The electronic device according to claim 8, wherein obtaining the reference transformation image corresponding to the face image by processing the face image using any style transfer model, comprises:
preprocessing the face image to obtain a convex hull image corresponding to the face image; and
processing the convex hull image and the face image by using any style transfer model, to obtain the reference transformation image corresponding to the face image.

12. The electronic device according to claim 8, wherein when the instructions are executed by the at least one processor, the at least one processor is further caused to perform:
obtaining a face image set and a transformation image set, corresponding to the target skin color, in response that a number of target transformation images matching the target skin color is greater than a first threshold; and
training an initial style transfer model based on the face image set and the transformation image set, to obtain a target style transfer model corresponding to the target skin color.

13. The electronic device according to claim 8, wherein when the instructions are executed by the at least one processor, the at least one processor is further caused to perform:
performing face segmentation on an image to be processed by using a face segmentation model to obtain the face image to be processed.

14. The electronic device according to claim 13, wherein when the instructions are executed by the at least one processor, the at least one processor is caused to perform:
determining a rotation angle of a face contained in the face image; and
rotating the face in response that the rotation angle is greater than or equal to a second threshold, so that a rotation angle of the rotated face is smaller than the second threshold.

15. A non-transitory computer-readable storage medium storing computer instructions, wherein the computer instructions are configured to cause a computer to execute a image processing method comprising:
performing skin color recognition on a face image to be processed to determine a target skin color of a face contained in the face image;
obtaining a reference transformation image corresponding to the face image by processing the face image using any style transfer model in response that a style transfer model set does not comprise a style transfer model corresponding to the target skin color;
obtaining a hue value, a saturation value, and a lightness value of each pixel in the reference transformation image by parsing the reference transformation image;
determining a target region in the reference transformation image based on the hue value, the saturation value, and the lightness value of each pixel in the reference transformation image; and
obtaining a target transformation image matching the target skin color by adjusting a hue value, a saturation value, and a lightness value of each pixel in the target region based on the target skin color.

16. The non-transitory computer-readable storage medium according to claim 15, wherein determining the target region in the reference transformation image based on the hue value, the saturation value, and the lightness value of each pixel in the reference transformation image, comprises:
determining a pixel in the reference transformation image, having a hue value in a first range, a saturation value in a second range, and a brightness value in a third range, as a pixel in the target region.

17. The non-transitory computer-readable storage medium according to claim 16, wherein the method further comprises:
obtaining an averaged hue value, an averaged saturation value, and an averaged lightness value of pixels in the target region;
determining a target hue range, a target saturation range, and a target lightness range based on a preset error value, the averaged hue value, the averaged saturation value, and the averaged lightness value; and
performing pruning process on the pixels in the target region based on the target hue range, the target saturation range, and the target lightness range.

18. The non-transitory computer-readable storage medium according to claim 15, wherein obtaining the reference transformation image corresponding to the face image by processing the face image using any style transfer model, comprises:
preprocessing the face image to obtain a convex hull image corresponding to the face image; and
processing the convex hull image and the face image by using any style transfer model, to obtain the reference transformation image corresponding to the face image.

19. The non-transitory computer-readable storage medium according to claim 15, wherein the method further comprises:
obtaining a face image set and a transformation image set, corresponding to the target skin color, in response that a number of target transformation images matching the target skin color is greater than a first threshold; and
training an initial style transfer model based on the face image set and the transformation image set, to obtain a target style transfer model corresponding to the target skin color.

20. The non-transitory computer-readable storage medium according to claim 15, wherein the method further comprises:
performing face segmentation on an image to be processed by using a face segmentation model to obtain the face image to be processed.

* * * * *